United States Patent [19]
Keijsper

[11] Patent Number: 5,340,787
[45] Date of Patent: Aug. 23, 1994

[54] POLYMERIZATION PROCESS

[75] Inventor: Johannes J. Keijsper, Amsterdam, Netherlands

[73] Assignee: Shell Oil Company, Houston, Tex.

[21] Appl. No.: 49,487

[22] Filed: Apr. 19, 1993

Related U.S. Application Data

[62] Division of Ser. No. 851,039, Mar. 12, 1992, Pat. No. 5,237,047.

[30] Foreign Application Priority Data

May 1, 1991 [NL] Netherlands .......................... 9100747

[51] Int. Cl.$^5$ .......................... B01J 31/22; B01J 31/18
[52] U.S. Cl. .................................. 502/162; 502/159; 502/168; 502/170
[58] Field of Search ................ 502/162, 168, 170, 159

[56] References Cited

U.S. PATENT DOCUMENTS

| | | | |
|---|---|---|---|
| 4,778,876 | 10/1988 | Doyle et al. | 528/392 |
| 4,940,776 | 7/1990 | Bakkum et al. | 528/392 |
| 5,055,552 | 10/1991 | Wong | 502/162 X |
| 5,227,464 | 7/1993 | Keijsper | 502/162 X |
| 5,236,047 | 8/1993 | Keijsper | 528/392 |

FOREIGN PATENT DOCUMENTS

0404228A2 12/1990 European Pat. Off. .

*Primary Examiner*—Asok Pal
*Attorney, Agent, or Firm*—James O. Okorafor

[57] ABSTRACT

An improved process for the production of linear alternating polymers of carbon monoxide and at least one ethylenically unsaturated hydrocarbon comprises contacting the carbon monoxide and hydrocarbon under polymerization conditions in the presence of a liquid reaction diluent and a supported catalyst composition formed from a compound of palladium, the anion of a strong non-hydrohalogenic acid and a bidentate ligand chemically bound to support particles having an average particle diameter of at least 500 $\mu$.

9 Claims, No Drawings

5,340,787

POLYMERIZATION PROCESS

This is a division, of application Ser. No. 851,039, filed Mar. 12, 1992 and now U.S. Pat. No. 5,237,047.

FIELD OF THE INVENTION

This invention relates to an improved process for the production of linear alternating polymers of carbon monoxide and at least one ethylenically unsaturated hydrocarbon. More particularly, the invention relates to such a process which employs a novel supported catalyst.

BACKGROUND OF THE INVENTION

The production of linear alternating polymers of carbon monoxide and at least one ethylenically unsaturated hydrocarbon is now well known in the art. Such linear alternating polymers, also known as polyketones or polyketone polymers, are of the general repeating formula

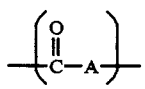 (I)

wherein A is a moiety derived from at least one ethylenically unsaturated hydrocarbon polymerized through the ethylenic linkage thereof. Such polymers are typically produced by contacting the monomeric reactants under polymerization conditions in the presence of a liquid reaction diluent and a catalyst composition formed from a compound of palladium, nickel or cobalt, the anion of a strong non-hydrohalogenic acid and a bidentate ligand of phosphorus, nitrogen or sulfur. It is also known to conduct the polymerization in the gas phase, e.g., U.S. Pat. No. 4,778,876 and it is also known to use a supported or heterogeneous catalyst composition, e.g., EP-A-04228.

Although the conventional, liquid-phase processes do efficiently produce polyketone polymer, there are some difficulties with those processes. In most cases a certain amount of reactor fouling takes place where polymer product adheres to the internal surfaces of the reactor as well as to the surfaces of any stirring means employed in the reactor. In some cases, the reactor fouling can be severe. One solution to the fouling problem is realized through the use of heterogeneous, supported catalyst compositions such as the catalysts of EP-A-404228. Such catalyst compositions are supported on insoluble supports having an average particle diameter of less than 300 μ and typically on the order of 100 μ. That particle size approximates the size of the polymer product particles, however, and separation of polymer and supported catalyst composition by physical methods can be difficult. Moreover, a relatively high proportion of catalyst residues is found in the polymer product which produces purification problems as well as representing loss of catalyst composition components. It would be of advantage to provide an improved process for the production of linear alternating polymers of carbon monoxide and at least one olefinically unsaturated hydrocarbon which employs somewhat different supported catalyst compositions and provides process advantages over known processes which use supported catalyst compositions.

SUMMARY OF THE INVENTION

The present invention provides an improved process for the production of linear alternating polymers of carbon monoxide and at least one ethylenically unsaturated hydrocarbon. More particularly, the present invention provides such an improved process which employs novel supported catalyst compositions having catalyst supports of particular diameter.

DESCRIPTION OF THE INVENTION

The process of the invention provides an improved process for the production of linear alternating polymers of carbon monoxide and at least one ethylenically unsaturated hydrocarbon by contacting the carbon monoxide and hydrocarbon under polymerization conditions in the presence of a liquid reaction diluent and a novel supported catalyst composition. The supported catalyst composition is formed from a compound of palladium, a bidentate ligand of phosphorus which contains at least one reactive group to bond the ligand to the catalyst support, and the anion of a strong non-hydrohalogenic acid. The catalyst support is a carrier having reactive functional groups and an average particle diameter greater than 500 μ.

The linear alternating polymers produced according to the process of the invention are polymers of carbon monoxide and at least one ethylenically unsaturated hydrocarbon of the above representative formula I. Suitable ethylenically unsaturated hydrocarbons have up to 20 carbon atoms inclusive but preferably have up to 10 carbon atoms inclusive. Illustrative of such unsaturated hydrocarbons are aliphatic hydrocarbons and particularly ethylene and other α-olefins such as propylene, 1-butene, isobutylene, 1-hexene, 1-octene and 1-dodecene. Also suitable are arylaliphatic unsaturated hydrocarbons comprising an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. The preferred polymer products of the invention are copolymers of carbon monoxide and ethylene or terpolymers of carbon monoxide, ethylene and a second ethylenically unsaturated hydrocarbon of at least 3 carbon atoms, particularly an α-olefin such as propylene.

The polyketone polymers are produced by contacting the carbon monoxide and hydrocarbon monomers under polymerization conditions in the presence of a liquid reaction diluent and a particular type of supported catalyst composition. The catalyst composition is formed from a compound of palladium, an anion of a strong non-hydrohalogenic acid and a bidentate ligand of phosphorus that has been chemically bound to the support through a reactive functional group present in the ligand. The support is a solid material of particular average particle diameter containing functional groups suitable for bonding with the bidentate phosphorus ligand.

Suitable supports containing reactive functional groups are illustrated by the following support types:

1) Carrier materials containing carbonyl groups such as preformed linear alternating polymers of carbon monoxide and at least one ethylenic hydrocarbon, particularly ethylene, 2) Carrier materials containing hydroxyl groups such as silica, alumina, silica-alumina and hydrogenated linear alternating polymers of type 1) wherein the carbonyl group has been hydrogenated to a secondary alcohol group, 3) Carrier materials containing carboxyl groups such as ethylene/methacrylic acid copolymers, 4) Carrier materials containing active halogen substituents such as chloromethyl-substituted polystyrenes and reaction products of silica with (2-chloroethyl)triethoxysilane, and 5) Carrier materials containing isocyanate groups such as poly[methylene(polyphenylisocyanate)].

The functional group-containing bidentate ligands of phosphorus are conventional and are described in European Patent Application 404228 incorporated herein by reference.

A) Ligands containing a hydroxyl group such as 2-hydroxy-1,3-bis[di(2-methoxyphenyl)phosphino]propane or 7-di(2-methoxyphenyl)phosphinomethyl-8-di(2-methoxyphenyl)phosphinooctanol-1, and B) Ligands containing trialkoxysilyl groups such as the reaction product of (3-isocyanatopropyl)triethoxysilane with 2-hydroxy-1,3-bis[di(2-methoxyphenyl)phosphino]propane or with 7-di(2-methoxyphenyl)phosphinomethyl-8-di(2-methoxyphenyl)phosphinooctanol-1.

Suitable combinations of functional group-containing bidentate ligands of phosphorus and a carrier material are illustrated by bidentate ligands containing hydroxyl groups, e.g., type A), and carrier material containing isocyanate groups, e.g., type 5), wherein the ligand is bound to the carrier by a carbonate linkage. Also suitable are combinations of a ligand having a hydroxyl group, e.g., type A), and a carrier having active halogen, e.g., type 4), where the ligand is bound to the carrier by an ether linkage. Preferred supported catalysts, however, are formed from combinations of ligands containing trialkoxysilyl groups, e.g., type B), and supports having hydroxyl groups such as the supports of type 2). Particularly preferred as the support are silica and silica-alumina, especially silica, and particularly preferred as the functional group-containing ligand is 2-hydroxy-1,3-bis[di(2-methoxyphenyl)phosphino]propane.

In a typical production of supported catalyst composition, the ligand is reacted with the support and subsequently the palladium compound and the anion are added to the resulting product. While a wide variety of palladium compounds are useful in the catalyst composition of the invention, preferred palladium compounds are palladium carboxylates and palladium acetate, palladium propionate, palladium butyrate and palladium hexanoate are satisfactory. Palladium acetate is particularly preferred. Sufficient palladium compound is utilized in the supported catalyst composition mixture to provide a ligand to palladium molar ratio of from about 1:1 to about 10:1. Preferred quantities of ligand and palladium are such that there will be from about 2 mols to about 5 mols of ligand per mol of palladium.

The anion component of the supported catalyst composition is the anion of a non-hydrohalogenic acid having a pKa below about 4 and preferably below 2. Illustrative anions are the anions of inorganic acids such as sulfuric acid and perchloric acid or organic acids including carboxylic acids such as trifluoroacetic acid, dichloroacetic acid and trichloroacetic acid, as well as sulfonic acids such as methanesulfonic acid, trifluoromethanesulfonic acid and p-toluenesulfonic acid. The anions of trifluoroacetic acid and p-toluenesulfonic acid are preferred. The anion is preferably provided as the free acid but in an alternate embodiment the anion is provided in the form of a metal salt, particularly as the metal salt of a non-noble transition metal, e.g., as the nickel or copper salt. However provided, the quantity of anion should be from about 1 mol to about 100 mols per mol of palladium, preferably from about 2 mols to about 50 mols per mol of palladium.

It is also useful on occasion to provide to the catalyst composition mixture an amount of organic oxidizing agent in order to enhance catalyst activity. Illustrative oxidizing agents include the quinones, both 1,2-quinones and 1,4-quinones, e.g., the benzoquinones, naphthoquinones and anthraquinones. The 1,4-quinones are generally preferred and particularly preferred is 1,4-naphthoquinone. As stated, the presence of organic oxidizing agent is not required and amounts of organic oxidizing agent up to about 10,000 mols per mol of palladium are satisfactory. When organic oxidizing agent is employed, amounts from about 5 mols to about 5000 mols per mol of palladium are preferred.

The preparation of the supported catalyst compositions of the invention is broadly conventional. Initially, the support and the functional group-containing ligand are reacted, often in the presence of a liquid reaction diluent, and the resulting product is washed to remove excess ligand and reaction by-products and then dried. The resulting supported ligand is then contacted with a mixture of palladium compound and anion source, generally in liquid-phase solution or in the presence of a liquid reaction diluent. The resulting product is washed and dried to produce the supported catalyst of the invention.

It is necessary for the operation of the process of the invention that the supported catalyst compositions be based on supports of particular average particle diameter. Use of such supports provides distinct advantages over the use of the smaller diameter supports such as those of European patent application 404228, as is discussed below. The catalyst support should have an average particle diameter of at least 500 $\mu$. Preferred catalyst compositions are based on supports with an average particle diameter of at least 750 $\mu$ and particularly preferred are catalyst compositions wherein the average particle diameter of the carrier is at least 1 mm.

Polymerization is conducted by contacting the monomeric reactants and a suspension of the supported catalyst composition in a liquid reaction diluent under polymerization conditions. Suitable reaction diluents are those in which the polymer product is at least substantially insoluble. Such diluents include lower alkanols such as methanol and ethanol and lower alkanones such as acetone and methyl ethyl ketone. Preferred as the reaction diluent is methanol. Typical polymerization conditions include a reaction temperature from about 25° C. to about 100° C. Preferred reaction temperatures are from about 30 ° C. to about 130° C. The reaction pressure is suitably from about 2 bar to about 150 bar although reaction pressures are from about 5 bar to about 50 bar.

In the polymerization mixture, the molar ratio of carbon monoxide to total ethylenically unsaturated hydrocarbon is from about 10:1 to about 1:10 but preferably is from about 5:1 to about 1:5. When the preferred terpolymers are produced, there will be from about 10 mols to about 100 mols of ethylene per mol of second ethylenically unsaturated hydrocarbon in the polymerization mixture. A quantity of supported catalyst composition should be used to provide from about $1 \times 10^{-7}$ mol to about $1 \times 10^{-3}$ mol of palladium per mol of total ethylenically unsaturated hydrocarbon. Preferred quantities of supported catalyst composition provide from about $1 \times 10^{-6}$ mol to about $1 \times 10^{-4}$ mol of palladium per mol of total ethylenically unsaturated hydrocarbon.

The process of the invention provides a number of distinct advantages over related conventional processes, even those employing supported catalysts of smaller particle diameter such as that of European patent application 404228. The presence of the supported catalyst compositions are known to reduce reactor fouling, but the presence of the catalyst compositions based on carrier particles of an average diameter of at least 500 μ generally provides a substantially lower degree of reactor fouling. The use of the particular supported catalyst compositions of the invention provides polymer product of higher limiting viscosity number (LVN) which is indicative of a higher molecular weight. In the case of polyketone polymers, a higher molecular weight is of importance since better physical properties are possessed by polymers of relatively high molecular weight. The present process produces polymer particles with an average particle diameter of about 300 μ. When the larger supported catalyst composition particles of the present invention are employed, it is possible to separate the polymer product and the supported catalyst composition particles by physical methods such as through the use of sieves or cyclones or by methods of fluidization or pneumatic segregation. The carrier particles thereby obtained possess residual catalytic activity and are suitable for recycle, particularly upon provision of make-up catalyst composition.

The invention is further illustrated by the following Comparative Examples (not of the invention) and the following Illustrative Embodiments which should not be regarded as limiting. The polymers produced were examined by $^{13}$C-NMR and found to be linear with alternating moieties derived from carbon monoxide and from ethylene. The intrinsic viscosity of the polymers (LVN) was measured in m-cresol at 60° C.

Comparative Experiment I

A supported phosphorus bidentate ligand was produced by boiling under reflux for 12 hours a mixture of 5.49 g of 2-hydroxy-1,3-bis[di(2-methoxyphenyl)phosphino ]propane 2.47 g of (3-isocyanatopropyl)triethoxysilane and 100 ml of xylene. After adding 38.56 g of silica with an average particle diameter of 100 μ, the mixture was again boiled under reflux for 12 hours. The supported bidentate phosphorus ligand was recovered by filtration, washed with xylene and dried.

Comparative Example II

A palladium compound/supported bidentate phosphorus ligand was prepared by stirring for 16 hours at room temperature 5.15 g of the supported ligand of Comparative Example I, 37 mg of palladium acetate and 50 ml of methanol. The resulting composition was recovered by filtration and dried. The composition contained 4.33 mg of palladium/g of composition.

Comparative Example III

A copolymer of carbon monoxide and ethylene was produced by charging 180 ml of methanol to an autoclave of 300 ml capacity equipped with a mechanical stirrer. After the contents of the autoclave had been brought to 80° C., an equimolar mixture of carbon monoxide and ethylene was introduced until a pressure of 60 bar was reached. A catalyst composition solution which comprised 24.5 ml of methanol, 1.5 ml toluene, 0.01 mmol palladium acetate, 0.011 mmol 1,3-bis[di(2-methoxyphenyl)phosphino]propane and 0.20 mmol trifluoroacetic acid was introduced into the autoclave. After 3 hours the polymerization was terminated by cooling the autoclave and autoclave and contents to room temperature and releasing the pressure.

The polymer suspension removed from the autoclave contained 10.7 g of copolymer while 1.9 g of copolymer remained on the internal surfaces of the reactor. The reactor fouling was therefor $1.9/(10.7+1.9) \times 100 = 15\%$. The polymerization rate was 4.0 kg of copolymer/g Pd hr. The polymer had an LVN of 1.6 dl/g and a palladium content of 80 ppm by weight.

Comparative Example IV

A copolymer of carbon monoxide and ethylene was prepared by a procedure substantially similar to that of Comparative Example III except that the reaction temperature was 90° C. instead of 80° C. and the reaction time 2.5 hours instead of 3 hours. The yield of polymer was 12.9 g, produced at a rate of 4.9 kg of copolymer/g Pd hr. The copolymer had an LVN of 1.1 dl/g and a palladium content of 60 ppm. The degree of reactor fouling was 10%.

Comparative Experiment V

A carbon monoxide/ethylene copolymer was prepared by charging 220 ml of methanol, 430 g of the palladium compound/phosphine ligand composition prepared according to Comparative Experiment II and 0,039 mmol trifluoroacetic acid to an autoclave of 300 ml capacity equipped with a mechanical stirrer. After the autoclave and contents had been warmed to 90° C., an equimolar mixture of carbon monoxide and ethylene was introduced until a pressure of 55 bar had been reached. The pressure in the autoclave was maintained during the resulting polymerization by continued addition of the equimolar mixture. After 5.52 hours the polymerization was terminated by cooling the reactor and contents to room temperature and releasing the pressure. The yield of copolymer was 10.5 g produced at a rate of 1.0 kg of copolymer/g Pd hr. The polymer had an LVN of 1.3 dl/g, a palladium content of 180 ppmw and a silicon content of 19000 ppmw. The degree of reactor fouling was 0.9%.

Illustrative Embodiment I

A supported phosphorus bidentate ligand was prepared by boiling under reflux for 24 hours a mixture of 4.87 g of 2-hydroxy-1,3-bis[di(2-methoxyphenyl)phosphino ]propane 2.48 g (3-isocyanatopropyl)triethoxysilane and 75 ml of xylene. After adding 11.8 g of silica with an average particle size of 2.3 mm, the mixture was again boiled under reflux for 24 hours. The solid, supported phosphorus bidentate ligand was recovered by filtration, washed with m-xylene and dried. The solid contained 10 mg of phosphorus/g of carrier.

Illustrative Embodiment II

A supported polymerization catalyst composition was prepared by stirring at room temperature for 5 hours a mixture of 300 mg of the supported ligand prepared according to Illustrative Embodiment I, 10.3 mg of palladium acetate, 0.09 ml of trifluoroacetic acid and 30 ml of acetone. The composition which resulted was recovered by filtration, washed with acetone and dried. The composition contained 8 mg of palladium per g of carrier.

Illustrative Embodiment III

A carbon monoxide/ethylene copolymer was produced by a procedure substantially similar to Comparative Experiment III except that the reaction temperature was 90° C. instead of 80° C. and 150 mg of the supported catalyst composition produced according to the procedure of Illustrative Embodiment II was employed instead of the catalyst composition solution. The polymer suspension was passed through a sieve of mesh size of 1.2 mm and the polymer was recovered from the solution by filtration. The polymer was then washed with methanol and dried. The yield of polymer was 9.5 g produced at a rate of 2.6 kg of polymer/g Pd hr. The copolymer had an LVN of 4.3 dl/g and a palladium content of 35 ppmw. The reactor fouling was 3%.

Illustrative Embodiment IV

A supported phosphorus bidentate ligand was prepared by boiling under reflux for 24 hours a mixture of 3.24 g of 2-hydroxy-1,3-bis[di(2-methoxyphenyl)phosphino]propane 1.57 g of (3-isocyanatopropyl)triethoxysilane and 50 ml of m-xylene. After adding 4 g of silica-alumina with an average particle diameter of 2 mm and an alumina content of 6.5% by weight, the mixture was again refluxed for 24 hours. The solid, supported phosphorus bidentate ligand was recovered by filtration, washed with m-xylene and dried. The composition contained 24 mg of phosphorus/g of carrier.

Illustrative Embodiment V

A palladium/phosphorus bidentate ligand/trifluoroacetic acid composition was produced by stirring for 5 hours at room temperature a mixture of 1000 mg of the supported ligand prepared according to Illustrative Embodiment IV, 87 mg of palladium acetate, 0.35 ml of trifluoroacetic acid and 300 ml of acetone. The resulting composition was recovered by filtration, washed with acetone and dried. The composition contained 14 mg of palladium/g of carrier.

Illustrative Embodiment VI

A carbon monoxide/ethylene copolymer was produced by a procedure substantially similar to that of Illustrative Embodiment III except that 70 mg of the catalyst composition prepared according to Illustrative Embodiment V was used instead of that prepared according to Illustrative Embodiment II, and the reaction time was 2.5 hours instead of 3 hours. The yield of copolymer was 2.5 g produced at the rate of 0.4 kg of copolymer/g Pd hr. The copolymer had an LVN of 3.0 dl/g and a palladium content of ppmw. The degree of reactor fouling was 2%.

Illustrative Embodiment VII

A supported phosphorus bidentate ligand was prepared by a procedure substantially similar to that of Illustrative Embodiment IV except that the silica-alumina had been pretreated with hydrochloric acid. The supported ligand contained 25 mg of phosphorus/g of carrier.

Illustrative Embodiment VIII

A palladium/phosphorus bidentate ligand/trifluoroacetic acid catalyst composition was prepared by a procedure substantially similar to that of Illustrative Embodiment V except that the supported ligand was produced according to the procedure of Illustrative Embodiment VII rather than the procedure of Illustrative Embodiment IV. The resulting catalyst composition contained 5 mg of palladium/g of carrier.

Illustrative Embodiment IX

A copolymer of carbon monoxide and ethylene was produced by a procedure substantially similar to that of Illustrative Embodiment III except that 80 mg of a catalyst composition prepared according to Illustrative Embodiment VIII was used instead of the composition prepared according to Illustrative Embodiment II, and the reaction time was 6 hours instead of 3 hours. The yield of copolymer was 3.5 g produced at a rate of 1.5 kg of copolymer/g Pd hr. The copolymer had an LVN of 2.7 dl/g and a palladium content of 30 ppmw..The degree of reactor fouling was 1%.

Illustrative Embodiment X

A supported phosphorus bidentate ligand was produced by boiling under reflux for 24 hours a mixture of 3.24 g of 2-hydroxy-1,3 bis[di(2-methoxyphenyl)phosphino]propane, 1.57 g of (3-isocyanatopropyl)triethoxysilane and 50 ml of m-xylene- After adding 7.5 g of silica with an average particle diameter of 2.3 mm the mixture was refluxed for 50 hours. The supported phosphorus ligand was recovered by filtration, washed with m-xylene and dried. The supported ligand contained 12 mg of phosphorus/g of carrier.

Illustrative Embodiment XI

A palladium/phosphorus bidentate ligand/trifluoroacetic acid composition was produced by stirring at room temperature for 5 hours a mixture of 760 mg of a supported ligand prepared according to Illustrative Embodiment X, 36 mg of palladium acetate, 0.16 ml trifluoroacetic acid and 30 ml acetone. The resulting composition was recovered by filtration, washed with acetone and dried. The composition contained 7 mg of palladium per g of carrier.

Illustrative Embodiment XII

A copolymer of carbon monoxide and ethylene was produced by a procedure substantially similar to that of Illustrative Embodiment III except that 100 mg of the catalyst composition prepared according to Illustrative Embodiment XI was used instead of the composition prepared according to Illustrative Embodiment II, the reaction temperature was 80° C. instead of 90° C. and the reaction time was 10 hours instead of 3 hours. The yield of copolymer was 3.6 g produced at a rate of 0.5 kg of copolymer/g Pd hr. The copolymer had an LVN of 5.3 dl/g, a palladium content of 0.7 mg, 15 ppmw and a silicon content of 353 ppmw. The degree of reactor fouling was 5%.

Illustrative Embodiment XIII

A carbon monoxide/ethylene copolymer was produced by a procedure substantially similar to that of Illustrative Embodiment III except that 100 mg of the catalyst composition prepared according to Illustrative Embodiment XI was used instead of the composition produced according to Illustrative Embodiment II, and the reaction time was 6 hours instead of 3 hours. The yield of copolymer was 8.8 g, produced at the rate of 2.1 kg of copolymer/g Pd hr. The copolymer had a LVN of 3.1 dl/g, a palladium content of 0.6 mg, 14 ppmw and a silicon content of 242 ppmw. The degree of reactor fouling was 1%.

Illustrative Embodiment XIV

A palladium/phosphorus bidentate ligand/trifluoroacetic acid catalyst composition was produced by stirring at room temperature for 5 hours a mixture of 500 mg of the supported ligand produced according to Illustrative Embodiment X, 26 mg of palladium acetate, 0.116 ml of trifluoroacetic acid and 30 ml of acetone. The resulting composition was recovered by filtration, washed with acetone and dried. The composition contained 9 mg of palladium per g of carrier.

Illustrative Embodiment XV

A carbon monoxide/ethylene copolymer was produced by a procedure substantially similar to that of Illustrative Embodiment III except that 120 mg of the catalyst composition produced according to Illustrative Embodiment XIV was used instead of the composition produced according to Illustrative Embodiment II, and the reaction time was 6 hours instead of 3 hours. The yield of copolymer was 4.5 g produced at a rate of 0.7 g of copolymer/g Pd hr. The copolymer had an LVN of 3.1 dl/g and contained 1.0 mg of palladium, 28 ppmw, and had a silicon content of 205 ppmw.

Illustrative Embodiment XVI

A carbon monoxide/ethylene copolymer was produced by a procedure substantially similar to that of Illustrative Embodiment III except that 100 mg of the catalyst composition produced according to Illustrative Embodiment XIV was used instead of the composition produced according to Illustrative Embodiment II, and the reaction time was 5 hours instead of 3 hours. The yield of copolymer was 4.0 g produced at the rate of 0.9 kg of polymer/g Pd hr. The copolymer had an LVN of 2.8 dl/g and contained 0.8 mg of palladium, 19 ppmw. The degree of reactor fouling was 1%.

Illustrative Embodiment XVII

A palladium/phosphorus bidentate ligand/p-toluenesulfonic acid catalyst composition was produced by stirring for 5 hours at room temperature a mixture of 500 mg of the supported phosphorus bidentate ligand of Illustrative Embodiment X, 25 mg of palladium acetate, 250 ml of p-toluenesulfonic acid and 30 ml of acetone. The resulting composition was recovered by filtration, washed with acetone and dried. The composition contained 7 mg of palladium per g of carrier.

Illustrative Embodiment XVIII

A copolymer of carbon monoxide and ethylene was produced by a procedure substantially similar to that of Illustrative Embodiment III except that 100 mg of the catalyst composition produced according to Illustrative Embodiment XVII was used instead of the composition according to Illustrative Embodiment II, and the reaction time was 5 hours instead of 3 hours. The yield of copolymer was 4.7 g produced at the rate of 1.3 kg of copolymer/g Pd hr. The copolymer had an LVN of 2.4 dl/g, a palladium content of 21 ppmw and a silicon content of 297 ppmw. The degree of reactor fouling was 5%.

Illustrative Embodiment XIX

A palladium/phosphorus bidentate ligand/trifluoroacetic acid catalyst composition was produced by stirring for 5 hours at room temperature a mixture of 207 mg of the supported ligand produced according to Illustrative Embodiment X, 10 mg of palladium acetate, 0.045 ml of trifluoroacetic acid and 30 ml of acetone. The resulting composition was recovered buy filtration, washed with acetone and dried. The composition contained 11 mg of palladium per g of carrier.

Illustrative Embodiment XX

A carbon monoxide/ethylene copolymer was produced by a procedure substantially similar to that of Illustrative Embodiment III except that 90 mg of the catalyst composition prepared according to Illustrative Embodiment XIX was used instead of the catalyst composition of Illustrative Embodiment II, and the reaction time was 5 hours instead of 3 hours. The yield of copolymer was 3.1 g of polymer, produced at the rate of 0.6 kg of copolymer/g Pd hr. The copolymer had an LVN of 4.1 dl/g and a palladium content of 0.8 mg, 31 ppmw.

Illustrative Embodiment XXI

A supported phosphorus ligand was prepared by boiling under reflux for 24 hours a mixture of 4.0 g of 7-[di(2-methoxyphenyl)phosphino]methyl-8-[di(2-methoxyphenyl)phosphino]-octanol-1, 1.57 g (3-isocyanatopropyl)triethoxysilane and 50 ml of m-xylene. After adding 5g of silica with an average particle diameter of 2.3 mm, the mixture was refluxed for 24 hours. The supported phosphorus bidentate ligand was recovered by filtration, washed with m-xylene and dried. The supported ligand contained 14 mg of phosphorus per g of carrier.

Illustrative Embodiment XXII

A palladium/phosphorus bidentate ligand/trifluoroacetic acid catalyst composition was prepared by stirring for 5 hours at room temperature 551 mg of the supported ligand prepared according to Illustrative Embodiment XXI, 0.15 ml of trifluoroacetic acid and 30 ml of acetone. The resulting composition was recovered by filtration, washed with acetone and dried. The composition contained 15 mg of palladium per g of carrier.

Illustrative Embodiment XXIII

A copolymer of carbon monoxide and ethylene was prepared by a procedure substantially similar to that of Illustrative Embodiment III except that 110 mg of the catalyst composition produced according to Illustrative Embodiment XXII was used instead of the composition of Illustrative Embodiment II, and the reaction time was 5 hours instead of 3 hours. The yield of copolymer was 3.1 g, produced at the rate of 0.4 kg of copolymer/g Pd hr. The copolymer had an LVN of 3.2 dl/g and a palladium content of 1.6 mg, 10 ppmw.

What is claimed is:

1. A supported catalyst composition, useful in the production of linear alternating polymers of carbon monoxide and at least one ethylenically unsaturated hydrocarbon, which catalyst composition comprises (a) a compound of palladium, (b) the anion of a nonhydrohalogenic acid having a pKa of below about 4 and (c) a bidentate ligand of phosphorus wherein the ligand is bound through reactive functional groups of the ligand to reactive functional groups of the catalyst composition support and the catalyst composition support particles have an average particle diameter of at least 500 μ.

2. The composition of claim 1 wherein the compound of palladium is palladium acetate.

3. The composition of claim 2 wherein the strong acid has a pKa below 2.

4. The composition of claim 3 wherein the reactive functional groups of the ligand are selected from the group consisting of hydroxyl and trialkoxysilyl.

5. The composition of claim 4 wherein the reactive functional groups of the support are selected from the group consisting of carbonyl, hydroxyl, carboxyl, halogen and isocyanate.

6. The composition of claim 2 wherein the carrier is silica or silica-alumina.

7. The composition of claim 6 wherein the ligand is 2-hydroxy-1,3-bis[di(2-methoxyphenyl)phosphino]propane or 7-di(2-methoxyphenyl)phosphinomethyl-8-di(2-methoxyphenyl)phosphinooctanol-1.

8. The composition of claim 7 wherein the anion is the anion of trifluoroacetic acid or p-toluenesulfonic acid.

9. The composition of claim 8 wherein the support is silica.

* * * * *